United States Patent [19]

Sanzari

[11] Patent Number: 5,416,583
[45] Date of Patent: May 16, 1995

[54] QUANTUM WELL BIAS MIRROR FOR PHASE MODULATION IN A RING LASER GYROSCOPE

[75] Inventor: Martin A. Sanzari, Hamburg, N.J.

[73] Assignee: Kearfott Guidance & Navigation Corporation, Wayne, N.J.

[21] Appl. No.: 99,992

[22] Filed: Jul. 30, 1993

[51] Int. Cl.$^6$ ............................................. G01C 19/68
[52] U.S. Cl. ........................................ 356/350; 372/99
[58] Field of Search ...................... 356/350; 372/94, 99

[56] References Cited

U.S. PATENT DOCUMENTS

| | | | |
|---|---|---|---|
| 3,851,973 | 12/1974 | Macek | 356/350 |
| 4,410,276 | 10/1983 | Ljung et al. | 356/350 |
| 4,525,687 | 6/1985 | Chemla et al. | 357/16 X |
| 4,627,732 | 12/1986 | Braun et al. | 356/350 |
| 4,904,045 | 2/1990 | Alferness et al. | 372/45 X |
| 5,007,695 | 4/1991 | Chang . | |
| 5,116,131 | 5/1991 | Farahani et al. | 356/350 |
| 5,137,358 | 8/1992 | Perkins | 356/350 |
| 5,138,628 | 8/1992 | Pocholle et al. | 372/99 |
| 5,177,749 | 1/1993 | Shigihara et al. | 372/99 X |

Primary Examiner—Vincent P. McGraw
Attorney, Agent, or Firm—Klauber & Jackson

[57] ABSTRACT

A quantum well bias mirror 30 provides phase modulation to two counter-propagating beams in a ring laser gyroscope so as to reduce or eliminate the effects of lock-in. The phase modulation is caused by inducing an index of refraction change, known as the Franz-Keldysh effect, in the quantum well bias mirror 30 by applying a varying electric field across a quantum well structure in the mirror 30. The quantum well bias mirror 30 is comprised of a substrate 32 coated with a plurality of dielectric layers 36,38 of alternately high and low refractive indices, respectively, which in turn are coated with a quantum well filter layer 34. The dielectric layers 36,38 are adjusted to provide maximum reflectivity of the counter-propagating beams. The quantum well filter layer 34 is adjusted to cause a reflection from its top surface when there is no electric field present and to cause a reflection from the top of the dielectric layers 36,38 when an electric field is present. The apparent disappearance of the quantum well filter layer 34 with the presence of an electric field acts to impart a differential phase shift between the two counter-propagating beams for establishing a frequency bias in the ring laser gyroscope, thereby reducing or eliminating the effects of lock-in.

39 Claims, 4 Drawing Sheets

QUANTUM WELL BIAS MIRROR FOR PHASE MODULATION IN A RING LASER GYROSCOPE

FIELD OF THE INVENTION

The present invention relates to ring laser gyroscopes and, more particularly, to an quantum well bias mirror for use in a ring laser gyroscope for imparting a differential phase shift between two counter-propagating oscillatory beams circulating in the ring so as to establish a frequency shift between the two beams.

BACKGROUND OF THE INVENTION

The ring laser gyroscope was developed as a logical replacement for the early mechanical inertial gyroscopes since ring laser gyroscopes have minimal moving parts thereby allowing extremely accurate rotational sensing. Based upon the principles of the Sagnac Effect, a ring laser gyroscope has at least two counter-propagating electromagnetic waves, typically light waves, that oscillate within an optical ring cavity. When an ideal ring laser gyroscope is stationary, no rotation is indicated by the sensor. However, when the ring cavity of the laser gyroscope is rotated about its central axis, the counter-propagating electromagnetic waves develop a beat frequency. Well above a characteristic mode locking zone, a linear relationship between this beat frequency and the rotation rate of the gyroscope with respect to an inertial frame of reference may be established.

Typically, a working ring laser gyroscope requires adjusting so as to approach the ideal linear relationship between the beat frequency and the rotation rate of the gyroscope. Such adjusting includes rate biasing or mechanical dithering to prevent the counter-propagating waves from mode locking at low rotation rates. This mode locking phenomenon, known as lock-in, occurs when the counter-propagating waves couple to the same frequency. If the rotation rate of a ring laser gyroscope starts at a value above that of where lock-in occurs, and is then decreased, the frequency difference between the two counter-propagating waves disappears at a certain rotation. Thus, lock-in always occurs at low rotation rates and results in the loss of rotational rate information.

Various techniques have been developed for adjusting ring laser gyroscopes so as to reduce or eliminate the effects of lock-in. One such technique is disclosed in U.S. Pat. No. 3,851,973, awarded to Macek. In this technique, a magnetic bias mirror is used to impart a non-reciprocal phase shift to two counter-propagating light beams so as to avoid lock-in. The bias mirror includes thin magnetic and dielectric layers disposed on a substrate. The magnetization of the magnetic layer is aligned parallel to the major surface of the mirror and normal to the plane of the ring so as to interact with plane polarized light aligned parallel to the ring plane to produce a non-reciprocal phase shift in the counter-propagating beams without distorting the polarization from the ring plane or converting it to elliptical form. The interaction between the light beams and magnetic field relied on to produce the bias is the transverse Kerr magneto-optic effect.

A major problem with the magnetic bias mirror described above is an undesired non-reciprocal loss or differential reflection of the counter-propagating beams in addition to the desired non-reciprocal or differential phase shift imparted to the beams. The non-reciprocal loss occurs as a consequence of the oppositely directed oscillatory beams being differentially reflected from the bias mirror and is believed to be attributed to the presence in the mirror of the magnetic layer which is characterized by a refractive index having both real and imaginary parts. This non-reciprocal loss of differential reflectivity is deleterious to the ring operation because it is likely to result in an undesired varying internal bias in the presence of backscatter. Furthermore, in the transverse Kerr effect, only p-polarized beams show a magneto-optic effect, and hence a differential phase shift. This means that additional optical elements such as Brewster windows must be introduced into the optical cavity to assure operation only in the p-polarized mode.

Another technique for adjusting ring laser gyroscopes so as to reduce or eliminate the effects of lock-in is disclosed in U.S. Pat. No. 4,410,276, awarded to Ljung et al. In this technique, at least two mirrors in a ring laser gyroscope are vibrated in a direction perpendicular to their reflective surfaces in equal and opposite amounts so as to maintain the total path length traveled by a pair of counter-propagating light beams, thereby resulting in a phase modulation that reduces or eliminates lock-in between the two counter-propagating light beams. This technique follows a simple methodology for phase modulating the two counter-propagating light beams without introducing the undesirable non-reciprocal losses or differential reflections that are present with the above described magnetic bias mirror technique. However, this technique also requires high maintenance mechanical components to control the vibrational movement of the mirrors in a precise manner so as to produce phase modulation in the ring laser gyroscope.

Accordingly, it would be desirable to incorporate the simple methodology proposed in the patent awarded to Ljung et al. for reducing or eliminating the effects of lock-in, while eliminating the need for any mechanical components to control the movement of the mirrors.

SUMMARY OF THE INVENTION

The present invention uses a quantum well bias mirror to provide phase modulation to two counter-propagating beams in a ring laser gyroscope so as to reduce or eliminate the effects of lock-in. The phase modulation is caused by inducing an index of refraction change, known as the Franz-Keldysh effect, in the quantum well bias mirror by applying a varying electric field across a quantum well structure in the mirror. The varying electric field across the quantum well structure is equivalent to vibrating the mirrors in an ordinary ring laser gyroscope in a direction perpendicular to their reflective surfaces, similar to the technique described above.

The present invention quantum well bias mirror is comprised of a substrate coated with a plurality of dielectric layers of alternately high and low refractive indices which in turn are coated with a quantum well structure. The dielectric layers are adjusted to provide maximum reflectivity of the counter-propagating ring laser beams. The quantum well structure is adjusted to cause a reflection from its top surface when there is no electric field present and cause a reflection from the top of the dielectric layers when an electric field is present. The apparent disappearance of the quantum well structure with the presence of an electric field acts to impart a differential phase shift between the beams for establishing a frequency bias in the ring, thereby reducing or eliminating the effects of lock-in in the ring laser gyroscope.

From the above descriptive summary it is apparent how the present invention quantum well bias mirror reduces or eliminates the effects of lock-in in a ring laser gyroscope in a functionally non-mechanical manner.

Accordingly, the primary objective of the present invention is to reduce or eliminate the effects of lock-in in a ring laser gyroscope by phase modulating the counter-propagating beams by inducing an index of refraction change known as the Franz-Keldysh effect in a quantum well structure.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE INVENTION

Figure 1:
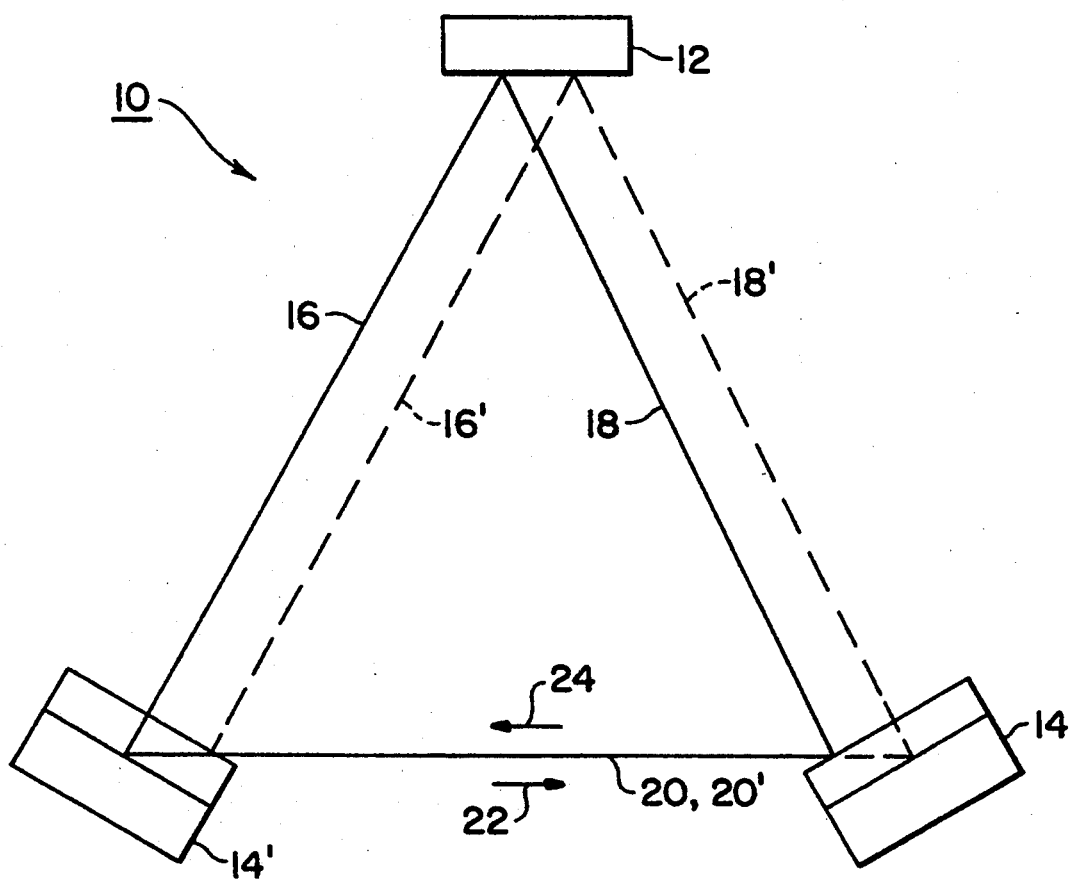
FIG. 1 is a schematic illustration of a ring laser gyroscope incorporating two non-reciprocal quantum well bias mirrors according to the present invention.

Referring to FIG. 1, a ring laser gyroscope 10 is shown with one dielectric mirror 12 and two quantum well bias mirrors 14 according to the present invention. Three rays 16,18,20 are also shown with each ray representing two laser beams traveling in opposite directions 22, 24 around a triangular path within the ring laser gyroscope 10. When quantum well bias mirror 14 is energized with an electric field and quantum well bias mirror 14' is unenergized, the two laser beams travel the path labeled 16–20. When quantum well bias mirror 14' is energized with an electric field and quantum well bias mirror 14 is unenergized, the two laser beams travel the path labeled 16'–20'. This dual action of the quantum well bias mirrors 14 causes a phase shift between the two laser beams, while leaving the total path length around the ring cavity 10 unchanged. Along with the dual action of the quantum well bias mirrors 14, even without ring rotation, non-reciprocal phase shift effects are produced by the mirrors 14 which cause the counter-propagating beams to split apart and oscillate at different frequencies, with the magnitude of the frequency split being dependent among other things upon the thickness of a quantum well structure within each quantum well bias mirror 14.

A quantum well structure is formed within each quantum well bias mirror 14 to modulate the phase of the counter-propagating beams in the ring laser gyroscope 10. The index of refraction of the quantum well structure can be changed by applying a voltage across it. A change in the index of refraction of the quantum well structure will detune the quantum well bias mirror 14 so that it appears as if an incident beam has traveled a greater distance into the mirror stack. By varying the voltage you may vary the path of the beams in the ring laser gyroscope cavity 10, while leaving the total path length of the beams around the ring cavity 10 unchanged.

Figure 2:
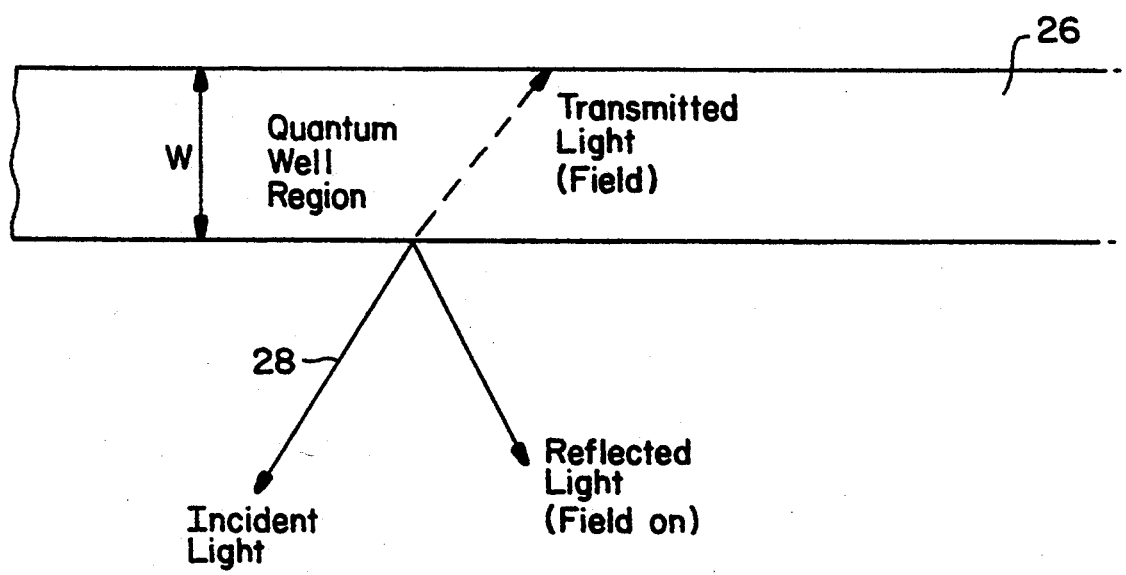
FIG. 2 is a schematic illustration of a quantum well boundary interface.

Referring to FIG. 2, a quantum well region 26 is shown having a thickness, w. Incident upon this quantum well region 26 is a laser beam 28. Assume that the laser beam 28 is initially traveling through an incident medium having an index of refraction of n2 and an absorption coefficient of $\alpha 2$. Also assume that the index of refraction and absorption coefficient of the quantum well region 26 are n1 and $\alpha 1$, respectively, but these parameters change to $n1+\delta n1$ and $\alpha 1+\delta \alpha 1$, respectively, when an electric field is applied thereto.

The incident laser beam 28 is transmitted straight through the quantum well region 26 when no electric field is applied to the region 26. When an electric field is applied to the quantum well region 26 parallel to the plane of incidence of the laser beam 28, a dielectric boundary is formed along that plane by a corresponding decrease in the refractive index of the quantum well region 26. Thus, with an electric field applied to the quantum well region 26, the incident laser beam 28 is reflected from the surface of the quantum well region 26. By oscillating the electric field applied to the quantum well region 26, an effective oscillating phase shift can be generated between a pair of incident laser beams. This concept is the basis for the use of the quantum well bias mirrors 14 in the ring laser gyroscope 10.

A multilayer thin film mirror structure can be designed having a quantum well region so that the light will be reflected from the surface of the region when an electric field is applied thereto and light will be transmitted through the region if no electric field is applied thereto. A change in the index of refraction of the quantum well region caused by the presence or the absence of an applied electric field will cause a pair of incident light beams to travel a shorter or a longer optical distance, respectively, thereby generating an effective phase shift between the pair of incident light beams upon their reflection from the multilayer thin film mirror structure. By oscillating the electric field applied to the quantum well region, the effective phase shift between the incident light beams will correspondingly oscillate.

Figure 3:
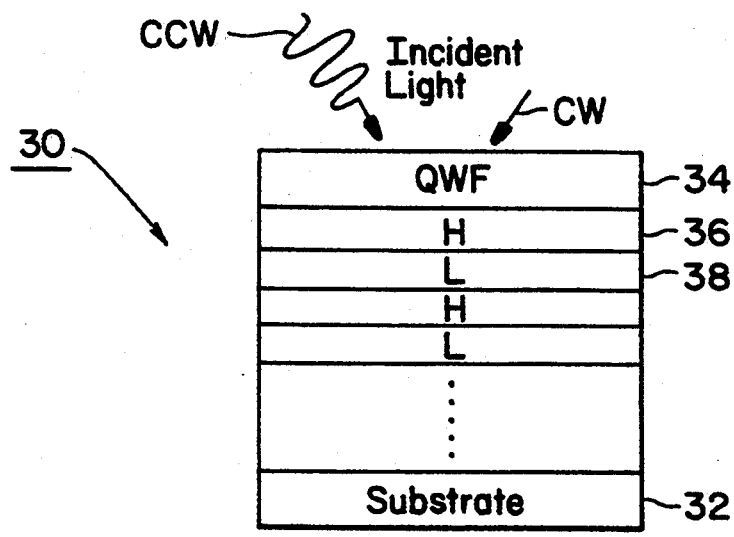
FIG. 3 is a cross-sectional view of a non-reciprocal quantum well bias mirror according to the present invention.

Referring to FIG. 3, a cross-sectional view of a quantum well bias mirror 30 is shown. This quantum well bias mirror 30, which is used to achieve a non-reciprocal phase shift in a ring laser gyroscope, is comprised of a supporting substrate member 32, a multiple quantum well filter layer 34, and a plurality of dielectric layers 36 and 38 having alternating high and low refractive indices, respectively. Each of the dielectric layers 36,38 has a phase thickness corresponding to the wavelength and the path of light passing therethrough so that light reflected from the bottom surface of each layer is in phase with light reflected from the top surface of each layer. The alternating high and low refractive indices of the dielectric layers 36,38 provide proper impedance matching to assure that the desired reflection characteristics are obtained. It should be noted that the substrate 32 can be fabricated from a variety of rigid, transparent materials such as quartz, while the plurality of dielectric layers 36,38 are typically fabricated from Titanium/Dioxide and Silicon/Dioxide, respectively, or similar dielectric materials having high and low indices of refraction, respectively. It should also be noted that excellent reflection characteristics are obtained when between fifteen and twenty-one layers of both the high and low refractive index dielectric layers 36,38 are used.

The quantum well bias mirror 30 is oriented in a ring laser gyroscope such that clockwise and counterclockwise light beams first impinge upon the surface of the quantum well layer 34, as shown. With no electric field applied to the quantum well layer 34, these light beams will be transmitted through the quantum well layer 34 and reflected from the plurality of dielectric layers 36, 38. Alternatively, with an electric field applied to the quantum well layer 34, these light beams will be reflected from the surface of the quantum well layer 34, thereby incurring a 180 degree phase shift. It should be noted that the index of refraction of the quantum well layer 34 must be higher than that of the incident medium through which the light beams travel, which is typically that of air, within the ring laser gyroscope in order to achieve a 180 degree phase shift.

Figure 4:
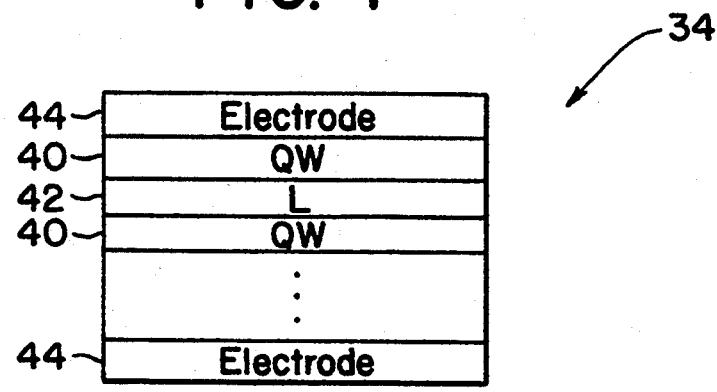
FIG. 4 is a cross-sectional view of a quantum well filter element according to the present invention.

Referring to FIG. 4, a cross-sectional view of the quantum well filter layer 34 is shown. This quantum well filter layer 34 is comprised of alternating layers of high index of refraction quantum well material 40 and low index of refraction dielectric material 42 sandwiched between a pair of electrodes 44. The electrodes 44 provide a means for creating an electric field across the quantum well and dielectric material layers 40,42 with a voltage differential applied thereto. A common quantum well material 40 is an Aluminum/Gallium/Indium/Phosphorus composition, although other material compositions having an overall high index of refraction are equally applicable. The low index of refraction dielectric material 42 is typically Silicon/Dioxide, or a similar dielectric material having a low index of refraction. The electrodes 44 can be fabricated from a variety of conductive materials such as Gold, but must be thin to allow light to be transmitted therethrough. It should be noted that excellent filtering characteristics are obtained when between fifteen and twenty-one layers of both the quantum well material 40 and the low refractive index dielectric material 42 are used.

Figure 5:
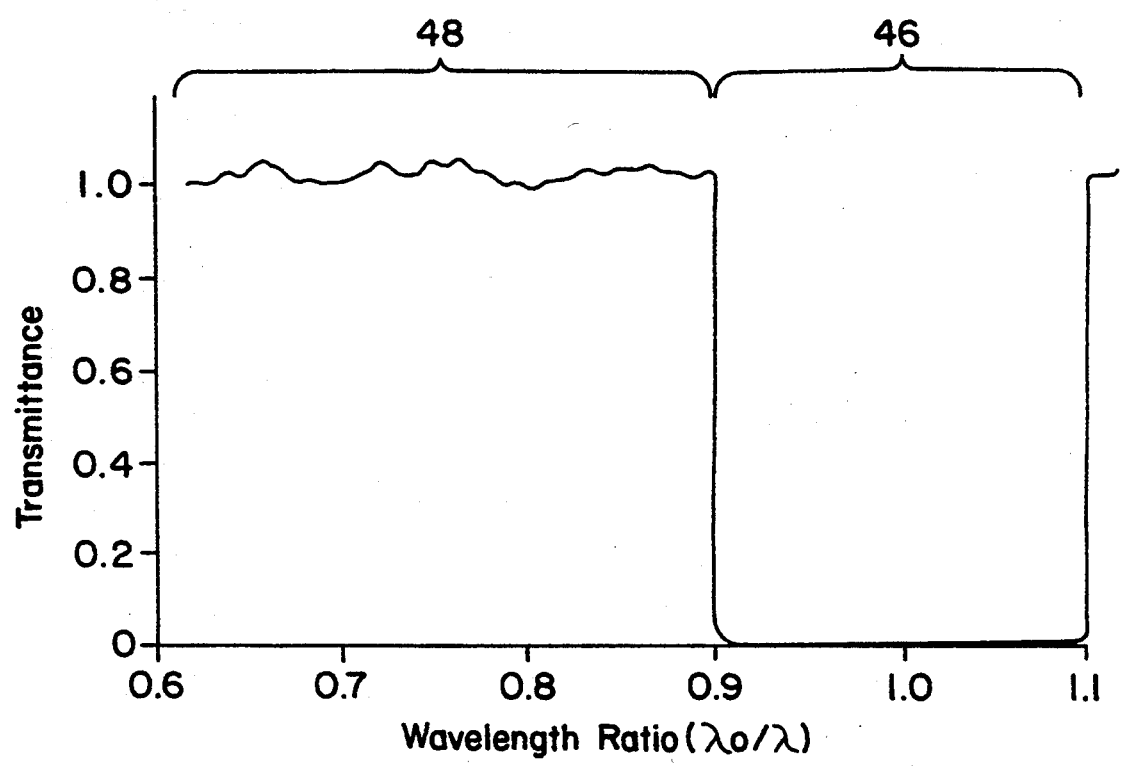
FIG. 5 is a graph showing the required edge filter behavior in the quantum well filter element shown in FIG. 4.

The index of refraction of the quantum well material 40 and the index of refraction of the dielectric material 42 are chosen to give a resulting edge filter as shown in FIG. 5. When the quantum well filter layer 34 is energized with an electric field, the quantum well filter layer 34 is highly reflective and is represented by a reflective region 46 in the graph. When the quantum well filter layer 34 is not energized with an electric field, the quantum well filter layer 34 is highly transparent and is represented by a transparent region 48 in the graph. The wavelength ratio ($\lambda_0/\lambda$) is determined by the wavelength of the incident light beams through the incident medium ($\lambda_0$) and the apparent wavelength of the incident light beams through the quantum well filter layer ($\lambda$).

At this point it should be noted that a similar quantum well bias mirror may be fabricated having a quantum well region that reflects light when no electric field is applied thereto and transmits light when an electric field is applied thereto. Such a similar quantum well bias mirror would be fabricated in essentially the same manner as described above, although different materials and/or different material thicknesses would be required for the quantum well filter layer.

Accordingly, with the present invention quantum well bias mirror 30 now fully described it is evident that the primary objective set forth above has been efficiently attained and, since certain changes may be made in the above described device 30 without departing from the scope of the invention, it is intended that all matter contained in the above description or shown in the accompanying drawings shall be interpreted as illustrative and not in a limiting sense.

What is claimed is:

1. A quantum well bias mirror for use in a ring laser gyroscope, said quantum well bias mirror comprising:
    a substrate;
    a plurality of dielectric layers formed on top of said substrate, said plurality of dielectric layers having alternating high and low refractive indices for providing a highly reflective mirror-like structure; and
    a multiple quantum well filter layer formed on top of said plurality of dielectric layers, said multiple quantum well filter layer having a property that allows incident radiation to be reflected therefrom upon the application of an electric field thereto while otherwise allowing incident radiation to be transmitted therethrough and reflected from the surfaces of said plurality of dielectric layers.

2. The quantum well bias mirror as defined in claim 1, wherein said substrate is fabricated from a rigid, transparent material.

3. The quantum well bias mirror as defined in claim 1, wherein each of said plurality of dielectric layers has a phase thickness corresponding to the wavelength of said incident radiation.

4. The quantum well bias mirror as defined in claim 3, wherein said plurality of dielectric layers are fabricated from dielectric material compositions having correspondingly overall high and low indices of refraction.

5. The quantum well bias mirror as defined in claim 1, wherein said multiple quantum well filter comprises:
    a plurality of alternating layers of high index of refraction quantum well material and low index of refraction dielectric material; and
    a pair of electrodes bordering said plurality of alternating layers of high index of refraction quantum well material and low index of refraction dielectric material, such that said electric field may be applied across said plurality of alternating layers of high index of refraction quantum well material and low index of refraction dielectric material.

6. The quantum well bias mirror as defined in claim 5, wherein said electric field is applied in a direction perpendicular to the surfaces of said plurality of alternating layers of high index of refraction quantum well material and low index of fraction dielectric material.

7. The quantum well bias mirror as defined in claim 6, where each of said plurality of high index of refraction quantum well material layers has a property that allows incident radiation to be reflected therefrom upon the application of said electric field thereto while otherwise allowing incident radiation to be transmitted therethrough.

8. The quantum well bias mirror as defined in claim 7, wherein said plurality of high index of refraction quantum well material layers are fabricated from material compositions having an overall high index of refraction.

9. The quantum well bias mirror as defined in claim 6, wherein each of said plurality of low index of refraction dielectric layers has a phase thickness corresponding to the wavelength of said incident radiation.

10. The quantum well bias mirror as defined in claim 9, wherein said plurality of low index of refraction dielectric layers are fabricated from dielectric material compositions having an overall low index of refraction.

11. The quantum well bias mirror as defined in claim 6, wherein said pair of electrodes border said plurality of alternating layers of high index of refraction quantum well material with thin layers of conductive material such that incident radiation may be transmitted therethrough.

12. The quantum well bias mirror as defined in claim 11, wherein said pair of electrodes are fabricated from a conductive material.

13. The quantum well bias mirror as defined in claim 2, wherein said substrate is fabricated from Quartz.

14. The quantum well bias mirror as defined in claim 4, wherein said plurality of dielectric layers having a high index of refraction are fabricated from Titanium/Dioxide, and wherein said plurality of dielectric layers having a low index of refraction are fabricated from Silicon/Dioxide.

15. The quantum well bias mirror as defined in claim 8, wherein said plurality of high index of refraction quantum well material layers are fabricated from an Aluminum/Gallium/Arsenic/Indium/Phosphorus composition.

16. The quantum well bias mirror as defined in claim 10, wherein said plurality of low index of refraction dielectric layers are fabricated from Silicon/Dioxide.

17. The quantum well bias mirror as defined in claim 12, wherein said pair of electrodes are fabricated from Gold.

18. A quantum well bias mirror for use in a ring laser gyroscope, said quantum well bias mirror comprising:
   a substrate;
   a plurality of dielectric layers formed on top said substrate, said plurality of dielectric layers having alternating high and low refractive indices for providing a highly reflective mirror-like structure; and
   a multiple quantum well filter layer formed on top of said plurality of dielectric layers, said multiple quantum well filter layer having a property that allows incident radiation to be transmitted therethrough and reflected from the surfaces of said plurality of dielectric layers upon the application of an electric field thereto while otherwise allowing incident radiation to be reflected therefrom.

19. The quantum well bias mirror as defined in claim 18, wherein said substrate is fabricated from a rigid, transparent material.

20. The quantum well bias mirror as defined in claim 18, wherein each of said plurality of dielectric layers has a phase thickness corresponding to the wavelength of said incident radiation.

21. The quantum well bias mirror as defined in claim 20, wherein said plurality of dielectric layers are fabricated from dielectric material compositions having correspondingly overall high and low indices of refraction.

22. The quantum well bias mirror as defined in claim 18, wherein said multiple quantum well filter comprises:
   a plurality of alternating layers of high index of refraction quantum well material and low index of refraction dielectric material; and
   a pair of electrodes bordering said plurality of alternating layers of high index of refraction quantum well material and low index of refraction dielectric material, such that said electric field may be applied across said plurality of alternating layers of high index of refraction quantum well material and low index of refraction dielectric material.

23. The quantum well bias mirror as defined in claim 22, wherein said electric field is applied in a direction perpendicular to the surfaces of said plurality of alternating layers of high index of refraction quantum well material and low index of refraction dielectric material.

24. The quantum well bias mirror as defined in claim 23, wherein each of said plurality of high index of refraction quantum well material layers has a property that allows incident radiation to be transmitted therethrough and reflected from the surfaces of said plurality of dielectric layers upon the application of said electric field thereto while otherwise allowing incident radiation to be reflected therefrom.

25. The quantum well bias mirror as defined in claim 24, wherein said plurality of high index of refraction quantum well material layers are fabricated from material compositions having an overall high index of refraction.

26. The quantum well bias mirror as defined in claim 23, wherein each of said plurality of low index of refraction dielectric layers has a phase thickness corresponding to the wavelength of said incident radiation.

27. The quantum well bias mirror as defined in claim 26, wherein said plurality of low index of refraction dielectric layers are fabricated from dielectric material compositions having an overall low index of refraction.

28. The quantum well bias mirror as defined in claim 23, wherein said pair of electrodes border said plurality of alternating layers of high index of refraction quantum well material and low index of refraction dielectric material with thin layers of conductive material such that incident radiation may be transmitted therethrough.

29. The quantum well bias mirror as defined in claim 28, wherein said pair of electrodes are fabricated from a conductive material.

30. The quantum well bias mirror as defined in claim 19, wherein said substrate is fabricated from Quartz.

31. The quantum well bias mirror as defined in claim 21, wherein said plurality of dielectric layers having a high index of refraction are fabricated from Titanium/Dioxide, and wherein said plurality of dielectric layers having a low index of refraction are fabricated from Silicon/Dioxide.

32. The quantum well bias mirror as defined in claim 25, wherein said plurality of high index of refraction quantum well material layers are fabricated from an Aluminum/Gallium/Arsenic/Indium/Phosphorus composition.

33. The quantum well bias mirror as defined in claim 27, wherein said plurality of low index of refraction dielectric layers are fabricated from Silicon/Dioxide.

34. The quantum well bias mirror as defined in claim 29, wherein said pair of electrodes are fabricated from Gold.

35. A ring laser gyroscope comprising:
   a closed loop optical cavity containing an active lasing medium for providing counter-propagating light beams along a closed path within said closed loop optical cavity; and
   a plurality of frequency biasing light reflective multilayer members for imparting a differential phase shift to said counter-propagating light beams, each said frequency biasing light reflective multilayer member containing a quantum well filter structure.

36. The ring laser gyroscope as defined in claim 35, wherein each said frequency biasing light reflective multilayer member comprises:
- a substrate;
- a plurality of dielectric layers formed on top of said substrate, said plurality of dielectric layers having alternating high and low refractive indices for providing a highly reflective mirror-like structure; and
- a multiple quantum well filter layer formed on top of said plurality of dielectric layers, said multiple quantum well filter layer having a property that allows said counter-propagating light beams to be transmitted therethrough and reflected from the surfaces of said plurality of dielectric layers upon the application of an electric field thereto while otherwise allowing said counter-propagating light beams to be reflected therefrom.

37. The ring laser gyroscope as defined in claim 36, wherein said multiple quantum well filter comprises:
- a plurality of alternating layers of high index of refraction quantum well material and low index of refraction dielectric material; and
- a pair of electrodes bordering said plurality of alternating layers of high index of refraction quantum well material and low index of refraction dielectric material, such that said electric field may be applied across said plurality of alternating layers of high index of refraction quantum well material and low index of refraction dielectric material.

38. The ring laser gyroscope as defined in claim 35, wherein each said frequency biasing light reflective multilayer member comprises:
- a substrate;
- a plurality of dielectric layers formed on top of said substrate, said plurality of dielectric layers having alternating high and low refractive indices for providing a highly reflective mirror-like structure; and
- a multiple quantum well filter layer formed on top of said plurality of dielectric layers, said multiple quantum well filter layer having a property that allows said counter-propagating light beams to be reflected therefrom upon the application of an electric field thereto while otherwise allowing said counter-propagating light beams to be transmitted therethrough and reflected from the surfaces of said plurality of dielectric layers.

39. The ring laser gyroscope as defined in claim 38, wherein said multiple quantum well filter comprises:
- a plurality of alternating layers of high index of refraction quantum well material and low index of refraction dielectric material; and
- a pair of electrodes bordering said plurality of alternating layers of high index of refraction quantum well material and low index of refraction dielectric material, such that said electric field may be applied across said plurality of alternating layers of high index of refraction quantum well material and low index of refraction dielectric material.

* * * * *